(12) United States Patent
Diab

(10) Patent No.: US 8,217,527 B2
(45) Date of Patent: Jul. 10, 2012

(54) MIDSPAN POWERING IN A POWER OVER ETHERNET SYSTEM

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 285 days.

(21) Appl. No.: 12/754,107

(22) Filed: Apr. 5, 2010

(65) Prior Publication Data

US 2010/0194190 A1    Aug. 5, 2010

Related U.S. Application Data

(63) Continuation of application No. 11/844,471, filed on Aug. 24, 2007, now Pat. No. 7,696,636.

(51) Int. Cl.
*H04B 3/54* (2006.01)
(52) U.S. Cl. ............................................. 307/1
(58) Field of Classification Search ....................... 307/1
See application file for complete search history.

(56) References Cited

U.S. PATENT DOCUMENTS

| 7,057,899 | B2 | 6/2006 | AbuGhazaleh et al. |
| 7,474,704 | B2 | 1/2009 | Lum et al. |
| 7,778,409 | B2 | 8/2010 | Karam |
| 2005/0197094 | A1 | 9/2005 | Darshan et al. |
| 2006/0078093 | A1 | 4/2006 | Karam et al. |
| 2006/0092826 | A1 | 5/2006 | Karam et al. |
| 2007/0077819 | A1 | 4/2007 | Thomson et al. |

FOREIGN PATENT DOCUMENTS

WO    WO 2006/052360 A1    5/2006

OTHER PUBLICATIONS

David Law and Wael William Diab, "100BASE-T normative 350uH inductance specification and IEEE P802.3at," IEEE P802.3at DTE Power Enhancements Task Force, Jul. 16-19, 2007.

*Primary Examiner* — Rexford Barnie
*Assistant Examiner* — Dru Parries
(74) *Attorney, Agent, or Firm* — Duane S. Kobayashi

(57) ABSTRACT

A midspan power sourcing equipment (PSE) for operation with power over Ethernet (PoE). The midspan PSE provides powering over wire pairs that are also used for data communication. To ensure compatibility with legacy Ethernet devices, the ports used for transmission of data are designed to present an increased level of inductance.

18 Claims, 5 Drawing Sheets

MIDSPAN POWERING IN A POWER OVER ETHERNET SYSTEM

This application is a continuation of non-provisional patent application Ser. No. 11/844,471, filed Aug. 24, 2007, which is incorporated by reference herein, in its entirety, for all purposes.

BACKGROUND

Field of the Invention

The present invention relates generally to Power over Ethernet (PoE) and, more particularly, to midspan powering in a PoE system.

Introduction

The IEEE 802.3af and 802.3at PoE specifications provide a framework for delivery of power from power sourcing equipment (PSE) to a powered device (PD) over Ethernet cabling. In this framework, various PDs can be deployed such as voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a Layer 1 power classification.

In one configuration, power can be sourced directly from data terminal equipment such as an Ethernet switch. This type of network device is referred to as an endspan device. In another configuration, power can be supplied by a midspan device. FIG. 1 illustrates such a midspan configuration, which includes a medium dependent interface (MDI) link between Ethernet switch 110 and PD 130. Midspan configurations can be used for 100BASE-TX systems. As illustrated, midspan PSE 120 is placed in the middle of the MDI link for the insertion of power to be supplied to PD 130. An advantage of such a midspan configuration is the usage of legacy Ethernet switches that do not have PoE capabilities.

In one midspan configuration, data is transmitted using pins 1 (TX+), 2 (TX−), 3 (RX+), and 6 (RX−) of the Ethernet cable. The remaining pins 4, 5, 7, and 8, which are representative of the two unused pairs of the Ethernet cable, can be used by midspan PSE 120 for the transmission of power to PD 130. In an alternative midspan configuration, power is not transmitted on the two unused pairs, but transmitted on the two signal pairs used for data transmission.

Midspan PSE design guidelines have not been tightly specified beyond a general recognition that the cabling channel performance should be maintained by the midspan PSE when it is inserted into an MDI link. What is needed therefore is a mechanism that ensures that a midspan PSE maintains proper compatibility with various network elements such as legacy Ethernet devices.

SUMMARY

A system and/or method for midspan powering in a PoE system, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
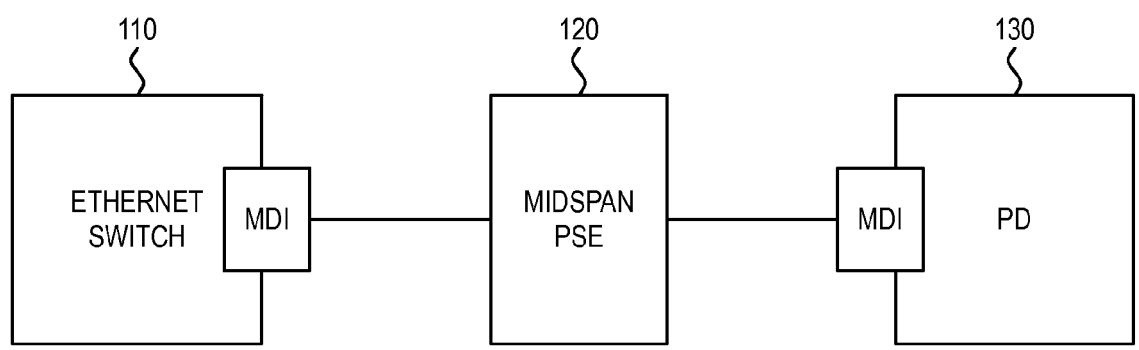
FIG. 1 illustrates an example of the inclusion of a midspan PSE in an MDI link.
Figure 2:
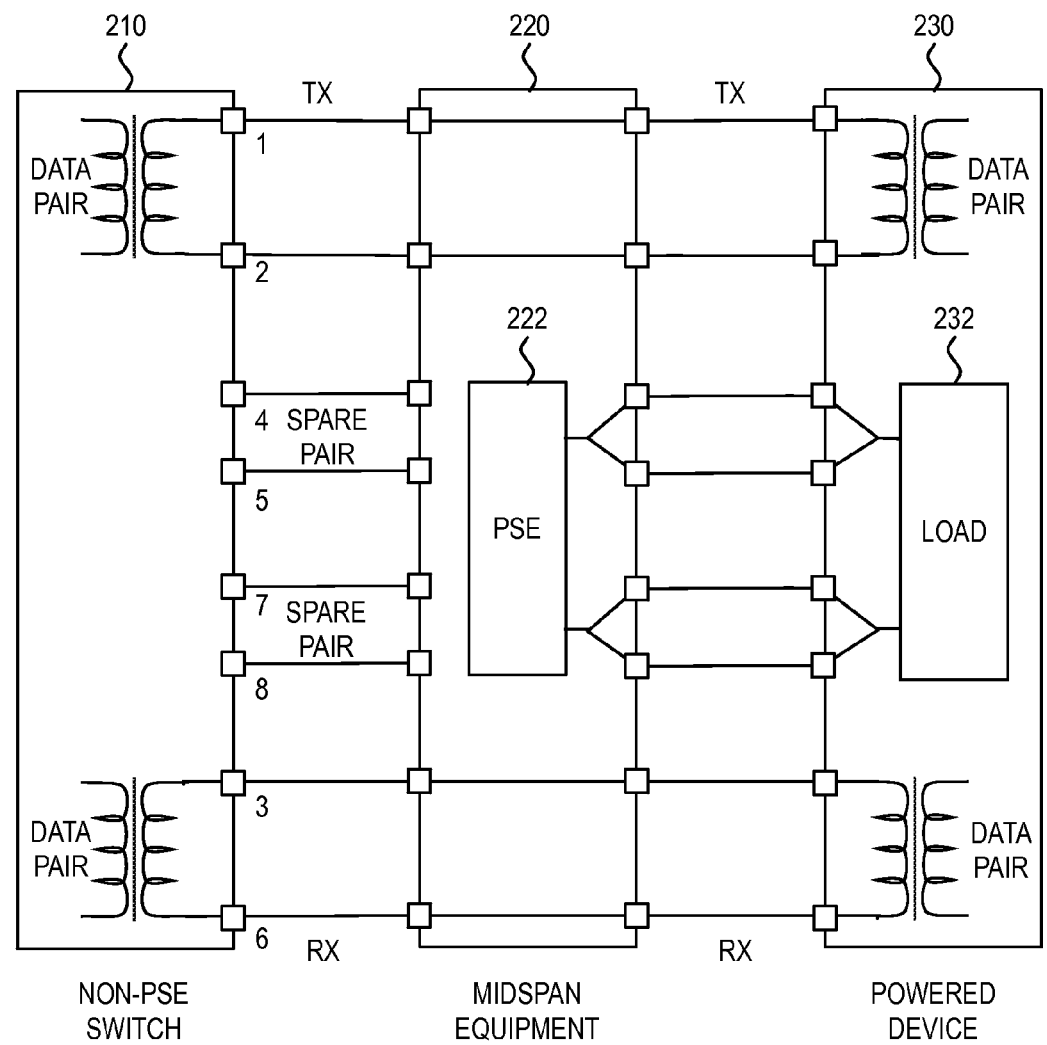
FIG. 2 illustrates an embodiment of powering a PD by midspan equipment using unused wire pairs.

As noted, one type of midspan PoE configuration can be designed to use the two unused wire pairs for the transmission of power to the PD (referred to as Alternative B). FIG. 2 illustrates an example of such a midspan configuration. As illustrated, the two unused wire pairs are terminated at midspan equipment 220. The remainder of the link of the two unused wire pairs is then used to transmit power from PSE 222 to PD 230. As power is inserted onto the link by midspan equipment 220, Ethernet switch 210 need not have PoE capabilities. Ethernet switch 210 can therefore represent legacy Ethernet equipment. In general, a PD is capable of receiving power from either wire pair in 802.3af and two-pair powering in 802.3at.

In a four-pair Ethernet cable, two signal wire pairs are used for data transmission. In one implementation, pins 1 (TX+) and 2 (TX−) are used for the transmission (TX) portion of the link, while pins 3 (RX+) and 6 (RX−) are used for the receiving (RX) portion of the link. Pins 4, 5, 7, and 8 represent the two unused wire pairs, which are not used in the portion of the link between Ethernet switch 210 and midspan equipment 220.

At midspan equipment 220, power is inserted using PSE 222. Specifically, PSE 222 provides power to PD 230 using the two unused wire pairs (pins 4, 5, 7, and 8), which are terminated at midspan equipment 220. The power carried on the two unused wire pairs is then extracted at PD 230 to power load 232.

As further illustrated in FIG. 2, the two signal wire pairs used for data transmission (pins 1, 2, 3, and 6) are passed through midspan equipment 220 onto PD 230. This pass-through connection can be implemented as an undisrupted channel connection between Ethernet switch 210 and PD 230. In other words, the characteristics of the wired channel connection between Ethernet switch 210 and PD 230 can be left largely undisturbed as the data transmissions pass through midspan equipment 220.

Figure 3:
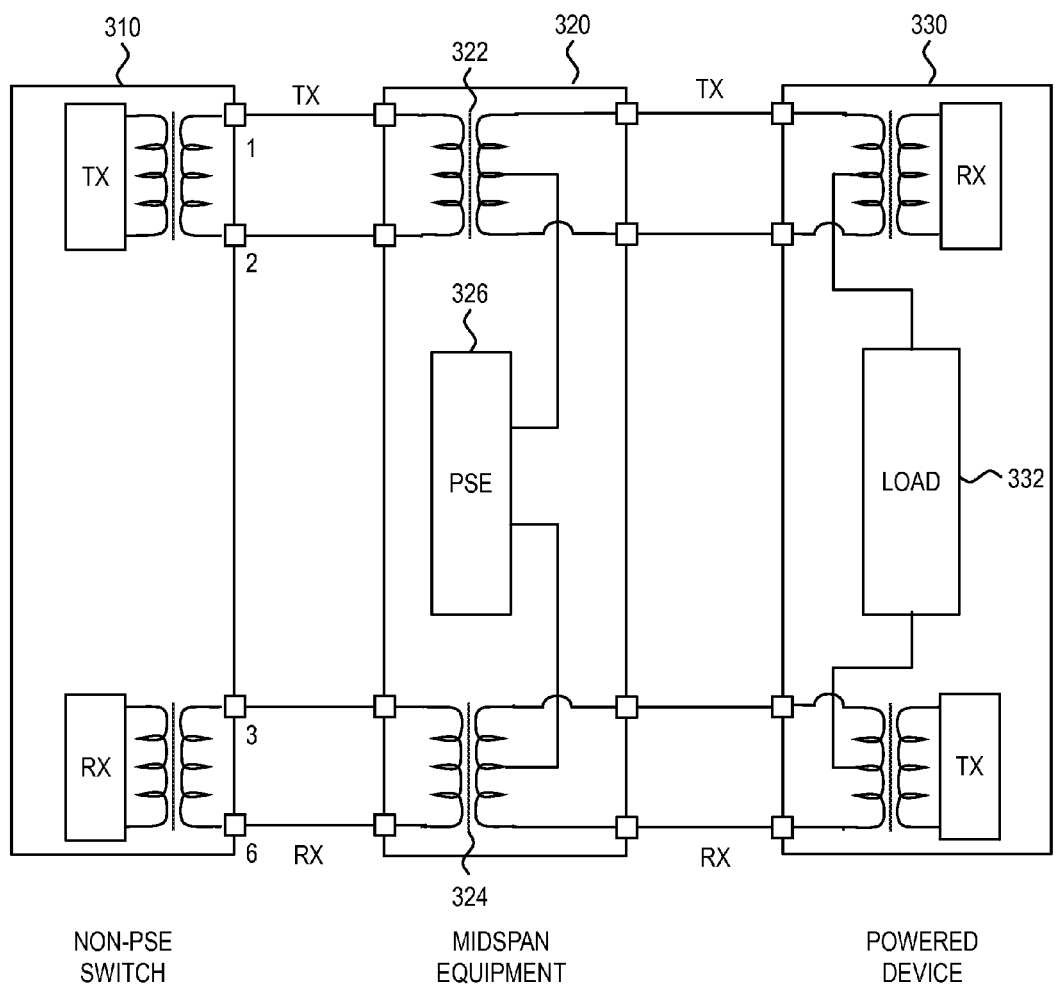
FIG. 3 illustrates an embodiment of powering a PD by midspan equipment using the data transmission signal wire pairs.

FIG. 3 illustrates an alternative midspan powering configuration that uses the two data transmission signal wire pairs for powering, instead of the two unused wire pairs. Thus, in the context of the example of FIG. 2, the two signal wire pairs represented by pins 1, 2, 3, and 6 can be used for both data transmission and powering. In this alternative midspan powering scheme, the channel connection between Ethernet switch 310 and PD 330 is disturbed to accommodate the insertion of power by PSE 326.

Consider, for example, the signal wire pair represented by pins 1 and 2. In this signal wire pair, data is transmitted from Ethernet switch 310 and received at midspan equipment 320. After passing through transformer 322, the data is then transmitted to PD 330. Similarly, for the signal wire pair represented by pins 3 and 6, data that is transmitted by PD 330 is received at midspan equipment 320. After passing through transformer 324, the data is then transmitted on to Ethernet switch 310.

The disruption in the channel connection between Ethernet switch 310 and PD 330 allows for the application of DC power on one side of the transformer that is isolated from the other side. Specifically, PSE 326 inserts power onto the data transmission signal wire pairs through the taps in transformers 322, 324. This transmitted power can then be extracted at PD 330 through the taps of the corresponding transformers in PD 330. The extracted power is then used to drive load 332.

One of the consequences of having a disrupted channel connection between Ethernet switch 310 and PD 330 is the impact on the end-to-end channel connection. Whereas previously a single transformer pair was used at the two ends of the link (i.e., Ethernet switch 310 and PD 330), two transformer pairs are now used at the ends of two segments of the link (i.e., ends of first segment between Ethernet switch 310 and midspan equipment 320 and ends of the second segment between midspan equipment 320 and PD 330).

In the present invention, it is recognized that the inclusion of the intermediary transformers 322, 324 in midspan equipment 320 can lead to mismatches between a transmitter and receiver. For example, consider the inductance requirement that is specified by the 100BASE-TX specification for the transmit side. As the 100BASE-TX specification sets forth, the minimum inductance measured at the transmit pins shall be greater than or equal to 350 µH with any DC bias current between 0-8 mA injected. As would be appreciated, other inductance ranges (higher or lower) can also be specified for a given application. For example, a higher inductance range can be specified to accommodate higher DC bias currents that would be expected in an application such as 802.3at. In addition to the transmitter inductance specification, the receiver of a 100BASE-TX PHY expects to see the effective inductance on the channel so that the signal quality and BER of the link is not impacted.

In general, the disturbance in the connection is not limited to the magnetic circuit. In some cases, the disruption can be caused in the effective inductance that is needed to maintain the signal quality such that a legacy 100BASE-TX PHY receiver can work.

In an undisrupted channel connection between Ethernet switch 310 and PD 330, this requirement can be met by the inclusion of a transmitter transformer at Ethernet switch 310 that presents at least 350 µH at the transmit pins. This minimum inductance level can be specified to present sufficient inductance that would overcome killer patterns that cause baseline wander so that the receiver can recover. In other words, the inductor at the source slows down the edges. For channel connections that are disrupted at midspan equipment 320, however, this transmitter transformer inductance characteristic would not apply to far end PD 330. As the applicable transmitter transformer inductance would be the level of inductance measured at the transmit pins of midspan equipment 320, the disruption would affect the behavior that the receiver sees. If the level of inductance measured at the transmit pins of midspan equipment 320 does not have a sufficient level of inductance, then the bit error rate (BER) can increase to unacceptable levels due to baseline wander. This issue is especially problematic when dealing with legacy equipment that does not have compensated physical layer devices (PHYs) at the receiving end.

Where the midspan equipment is used to provide power onto the two unused wire pairs, the impact of the midspan equipment design onto the two data transmission wire pairs is minimized due to a simple pass through channel connection. The provision of power by the midspan equipment on the same signal wire pairs used for data transmission, on the other hand, raises the level of importance of the characteristics of the midspan equipment design. This results since the end devices would see the transmit sections of the midspan equipment as the far end device instead of the transmit sections of the other end device.

Figure 4:
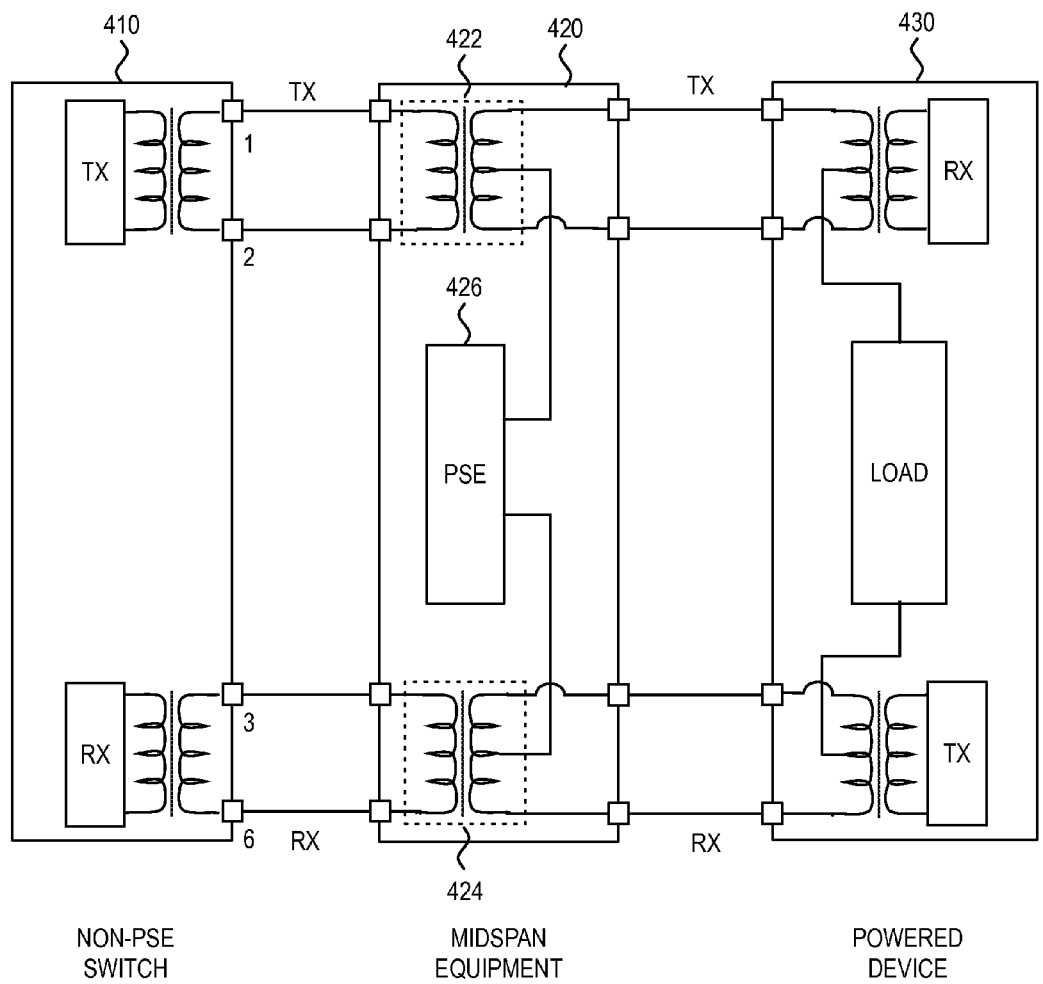
FIG. 4 illustrates an embodiment of midspan equipment that maintains compatibility with legacy Ethernet devices.

It is therefore a feature of the present invention that the midspan equipment is designed to ensure compatibility with all legacy equipment whether or not power is inserted by the midspan equipment onto the two data transmission signal wire pairs. This compatibility is enabled through the insertion of inductance at the midspan to overcome killer patterns that can cause baseline wander, thereby enabling the receiver to recover. As would be appreciated, this effect would be felt regardless of the level of inductance at the switch. In other words, for designs that do not have inductance in the PHY, the insertion of the inductance at the midspan can alleviate the issue. FIG. 4 illustrates one embodiment of midspan equipment according to the present invention.

As illustrated, midspan equipment 420 is situated between Ethernet switch 410 and PD 430 in providing power on the two data transmission wire pairs. In this powering arrangement, the receiver in PD 430 would not see a transmission section of Ethernet switch 410 at the far end of the link. Rather, the receiver in PD 430 would see a transmission section in midspan equipment 420 at the far end of the link. Similarly, the receiver in Ethernet switch 410 would not see the transmission section in PD 430 at the far end of the link. Rather, the receiver in Ethernet switch 410 would see a transmission section in midspan equipment 420 at the far end of the link.

For this reason, the midspan equipment design on the transmit side is critical for ensuring proper compatibility with legacy equipment. In one embodiment, the transmission transformers 422, 424 are configured to present a minimum level of inductance (e.g., 350 µH) in various operating conditions (e.g., whether or not power is being applied). Here, it should be noted that this inductance requirement could be more stringent than the 100BASE-TX specification, which does not consider the additional impact of PSE powering on the DC bias current in the link beyond the 8 mA limit.

This midspan equipment design of the present invention enables the support of legacy PHYs on either end of the link. The legacy PHY can be included in either the switch or the PD. As such, the inclusion of an inductance requirement in the midspan equipment design enables the support of legacy Ethernet switches and PDs. For example, the midspan equipment design of the present invention can enable legacy PHY devices that rely on a certain inductance level (e.g., 350 µH) at the transmitter, which inductance level may not be supported by current transmitter devices. In general, the principles of the present invention places an increased design constraint on midspan equipment. This is in contrast to conventional midspan equipment designs that are designed to insert power onto the two unused wire pairs. For those applications, no inductance requirement for the transmitter transformers would be necessary as data communication and powering would occur on separate sets of wire pairs.

Figure 5:
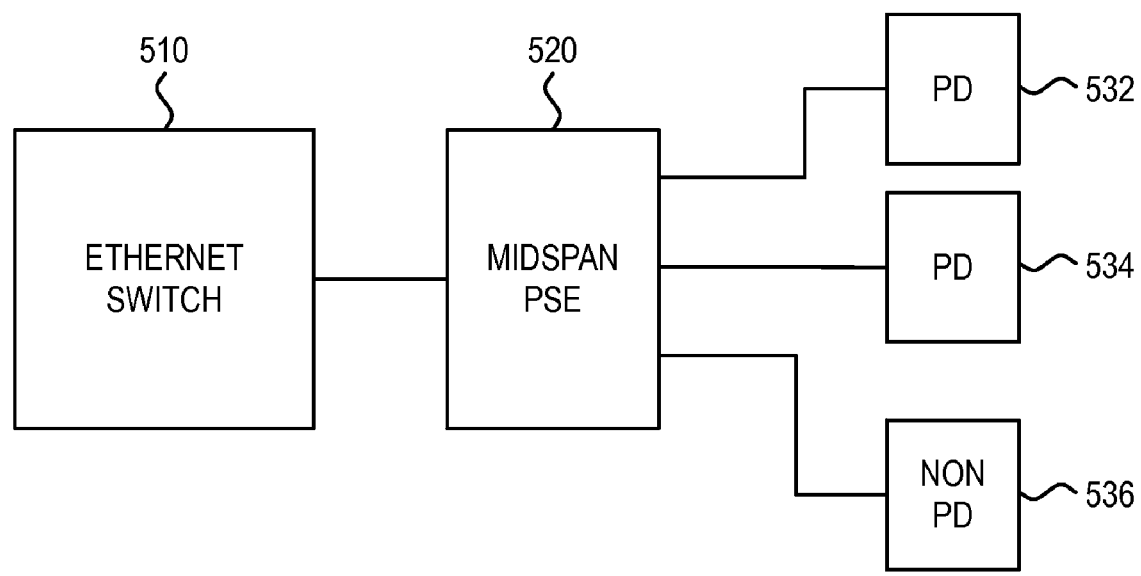
FIG. 5 illustrates an example of the support of non-PDs by midspan equipment.

As noted, the principles of the present invention would apply regardless of whether power was applied to the signal wire pairs. In one scenario, the midspan equipment design can also support non-PD devices that have legacy PHYs. These non-PD devices would not receive power since they would not be discovered as valid PD devices. FIG. 5 illustrates an example of such a scenario where PDs 532, 534 and non-PD 536 are supported by midspan PSE 520. Here, each of PDs 532, 534 and non-PD 536 can be a 100BASE-TX link partner that is attached to midspan PSE 520 and switch 510. If midspan PSE 520 is designed to present a certain inductance level, then midspan PSE 520 can support a legacy PHY in non-PD 536, regardless of whether Ethernet switch 510 could present such an inductance level.

In one embodiment, the principles of the present invention can also be applied to four-pair PoE powering schemes such as 802.3at. In these four-pair PoE powering schemes, all four pairs of the Ethernet cable are used to carry power to the PD. As such, any wire pair that is used for both data transmission and power would benefit from the principles of the present invention.

Finally, the principles of the present invention can also be applied to medium dependent interface crossover (MDIX) ports.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A midspan power sourcing equipment situated between a plurality of devices and a switch, the midspan power sourcing equipment facilitating a provision of power from a power source to at least one of the plurality of devices, comprising:
    a plurality of ports, at least one of said plurality of ports capable of powering a device connected to the midspan power sourcing equipment; and
    a transformer associated with one of said plurality of ports, said transformer enabling data communication between the switch and a device, said transformer presenting a level of inductance that approximates a level of inductance presented at a transmission port of an end device.

2. The midspan power sourcing equipment of claim 1, wherein said level of inductance is at least 350 μH.

3. The midspan power sourcing equipment of claim 1, wherein said level of inductance meets the 100BASE-TX specification.

4. The midspan power sourcing equipment of claim 1, wherein said level of inductance is sufficient to ensure compatibility with a PHY at a receiving device that does not compensate for base line wander.

5. The midspan power sourcing equipment of claim 1, wherein the power source conforms to the 802.3af specification.

6. The midspan power sourcing equipment of claim 1, wherein the power source conforms to the 802.3at specification.

7. The midspan power sourcing equipment of claim 1, wherein said data communication conforms with 100BASE-TX.

8. The midspan power sourcing equipment of claim 1, wherein said transformer is associated with a port that powers a device.

9. A midspan power sourcing equipment, comprising:
    a transformer that is coupled to a first wire pair for data transmission to a powered device; and
    a power source that is connected to a tap of said transformer, wherein said transformer presents a level of inductance that approximates a level of inductance presented at a transmission port of an end device.

10. The midspan power sourcing equipment of claim 9, wherein said data transmission is 100BASE-TX.

11. The midspan power sourcing equipment of claim 9, wherein said transformer has at least 350 μH of inductance.

12. The midspan power sourcing equipment of claim 9, wherein said transformer has a level of inductance that meets the 100BASE-TX specification.

13. The midspan power sourcing equipment of claim 9, wherein said transformer has a level of inductance that is sufficient to operate with a PHY that does not compensate for base line wander.

14. A system for powering a powered device, comprising:
    a switch having a plurality of ports; and
    a midspan power sourcing equipment for powering a plurality of devices, said midspan power sourcing equipment facilitating data connections between said plurality of devices and said switch, said midspan power sourcing equipment including at least one port that presents a level of inductance that approximates a level of inductance presented at a transmission port of said switch.

15. The midspan power sourcing equipment of claim 14, where said level of inductance is produced by a transformer.

16. The midspan power sourcing equipment of claim 14, where said level of inductance is at least 350 μH.

17. The midspan power sourcing equipment of claim 14, where said level of inductance meets the 100BASE-TX specification.

18. The midspan power sourcing equipment of claim 14, wherein all ports of said midspan power sourcing equipment presents said level of inductance.

* * * * *